United States Patent
Upp et al.

(10) Patent No.: US 9,843,928 B2
(45) Date of Patent: Dec. 12, 2017

(54) METHOD AND APPARATUS FOR CONNECTING A COMMUNICATION DEVICE TO A DEPLOYABLE NETWORK WITHOUT COMPROMISING AUTHENTICATION KEYS

(71) Applicant: MOTOROLA SOLUTIONS, INC, Schaumburg, IL (US)

(72) Inventors: Steven D Upp, Bartlett, IL (US); Isam R Makhlouf, Lake Zurich, IL (US); Francesca Schuler, Palatine, IL (US); Gino A Scribano, St. Charles, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 538 days.

(21) Appl. No.: 14/528,459

(22) Filed: Oct. 30, 2014

(65) Prior Publication Data
US 2016/0127340 A1   May 5, 2016

(51) Int. Cl.
*H04L 9/08* (2006.01)
*H04W 12/04* (2009.01)
(Continued)

(52) U.S. Cl.
CPC ...... *H04W 12/04* (2013.01); *G06F 17/30864* (2013.01); *H04L 9/08* (2013.01);
(Continued)

(58) Field of Classification Search
None
See application file for complete search history.

(56) References Cited

U.S. PATENT DOCUMENTS 7,945,777 B2    5/2011   Tando et al.
8,059,821 B1*  11/2011   Begen .................. H04L 63/068
                                                              380/286
(Continued)

OTHER PUBLICATIONS

Midkiff et al. "Rapidly-Deployable Broadband Wireless Networks for Disaster and Emergency Response" IEEE Workshop on Disaster Recovery Networks, Jun. 24, 2002. http://www.ee.columbia.edu~aurel/workshops/diren02/Midkiff_Bostian_DIREN02.pdf.*

(Continued)

*Primary Examiner* — Jung Kim
*Assistant Examiner* — Ngoc D Nguyen

(57) ABSTRACT

A method and apparatus is provided for connecting a communication device to a deployable system. The deployable system obtains at least one deployable key derived on a fixed system for the deployable system based on an existing key stored on a database of the fixed system, wherein the existing key is used to authenticate a communication device. The deployable system stores the derived key. Subsequent to the storing, the deployable system is activated to provide communication resources to communication devices disconnected from the fixed system. The activated deployable system is not connected to the fixed system. The activated deployable system receives an authentication request from the communication device requesting connection to the deployable system; generates authentication vectors using the at least one derived deployable key; and authenticates an authentication response received from the communication device using the authentication vectors.

12 Claims, 4 Drawing Sheets

(51) Int. Cl.
*G06F 17/30* (2006.01)
*H04W 12/06* (2009.01)
*H04L 29/06* (2006.01)

(52) U.S. Cl.
CPC ........... *H04L 9/0819* (2013.01); *H04W 12/06* (2013.01); *H04L 9/0838* (2013.01); *H04L 63/08* (2013.01)

(56) References Cited

U.S. PATENT DOCUMENTS

| | | | |
|---|---|---|---|
| 8,307,205 B2 | 11/2012 | Cha et al. | |
| 2007/0064647 A1* | 3/2007 | Prasad | H04L 63/0869 370/331 |
| 2008/0004006 A1* | 1/2008 | Datta | H04W 60/00 455/432.1 |
| 2008/0267407 A1* | 10/2008 | Vanderveen | H04L 9/083 380/277 |
| 2009/0007238 A1* | 1/2009 | Klein | H04W 8/08 726/4 |
| 2009/0086973 A1* | 4/2009 | Buddhikot | H04L 9/0822 380/273 |
| 2009/0264094 A1* | 10/2009 | Smith | G08B 25/016 455/404.2 |
| 2010/0190500 A1 | 7/2010 | Choi et al. | |
| 2011/0004758 A1 | 1/2011 | Walker et al. | |
| 2011/0078763 A1* | 3/2011 | Kan | H04L 41/28 726/3 |
| 2011/0314287 A1 | 12/2011 | Escott et al. | |
| 2012/0254615 A1 | 10/2012 | Ma et al. | |
| 2013/0205390 A1 | 8/2013 | Hauk et al. | |

OTHER PUBLICATIONS

Sakano et al. "Disaster-Resilient Networking: A New Vision Based on Movable and Deployable Resource Units" IEEE Network Jul./Aug. 2013. http://ieeexplore.ieee.org/stamp/stamp.jsp?arnumber=6574664.*

Suzuki et al. "An Ad Hoc Network in the Sky, SKYMESH, for Large-scale Disaster Recovery" IEEE 2006. http://ieeexplore.ieee.org/stamp/stamp.jsp?arnumber=4109761.*

* cited by examiner

METHOD AND APPARATUS FOR CONNECTING A COMMUNICATION DEVICE TO A DEPLOYABLE NETWORK WITHOUT COMPROMISING AUTHENTICATION KEYS

BACKGROUND OF THE INVENTION

In the case of a natural disaster, for example, a hurricane, all connections to an existing fixed Long Term Evolution (LTE) network infrastructure may be lost. The fixed LTE network infrastructure may include network equipment connected to, for example, cell sites, mobile switching offices and other communication assets of a service provider. When connectivity to the fixed LTE network infrastructure is lost, emergency communication may become impacted. To fill-in during an emergency, deployable LTE infrastructure may be temporarily installed and activated to provide temporary LTE coverage. When activated, the deployable LTE infrastructure is not connected to the fixed LTE network infrastructure and the deployable LTE infrastructure may remain active for an extended amount of time while the fixed LTE network infrastructure is being returned to service. The introduction of a deployable LTE infrastructure to replace the fixed LTE network infrastructure must be secured to avoid compromising devices communicating on the fixed LTE network infrastructure by, for example, introducing vulnerabilities into a process by which the devices mutually authenticate to the fixed LTE network infrastructure.

LTE networks include, among other components, databases such as a Home Subscriber Server (HSS) (also referred to herein as a fixed HSS) that stores user-related and subscription-related information. For example, the fixed HSS is configured to store the international mobile subscriber identity (IMSI) and a related authentication key (K) used to identify and authenticate a subscriber on a communication device (such as a mobile phone and a computer). To prevent unauthorized use of an LTE network infrastructure, the fixed HSS and the information stored therein must be protected.

The 3rd Generation Partnership Project (3GPP) architecture utilizes a symmetric authentication method called Authentication Key Agreement. The authentication key agreement relies on connectivity to the fixed HSS and an Authentication Center (AuC) in the LTE network in order to obtain data that is necessary to successfully complete network entry authentication between the fixed HSS and a communication device requiring access to the LTE network. This model does not work if connectivity to the fixed HSS/AuC is not available, for example, when connection to the fixed LTE network infrastructure is lost.

In circumstances where there is no connectivity to the fixed HSS/AuC, to extend coverage to remote locations and/or to facilitate emergency communications, it may be necessary to deploy an independent deployable LTE system (i.e. an LTE system that is not connected to the fixed LTE network infrastructure). The deployable system may be provided in a mobile environment, for example, on a truck. For the deployable system to successfully complete network entry authentication of communication devices, the deployable system must maintain its own HSS (referred to herein as a deployable HSS) when there is no connectivity to the fixed LTE network infrastructure. The deployable HSS is also configured to store user-related and subscription-related information. However, replication of data from the fixed HSS to the deployable HSS could potentially expose critically sensitive authentication keys to a less secured environment (for example, a mobile deployable system). Accordingly, authentication keys and other user-related and subscription-related information for providing access to the LTE network may be vulnerable to compromise if that data is copied from the fixed HSS to the deployable HSS and access to the data stored in the deployable HSS is compromised. Compromising the deployable HSS compromises the fixed network as well.

Accordingly, there is a need for a method and apparatus for connecting a communication device to a deployable system without compromising authentication keys stored on a database on the fixed LTE network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
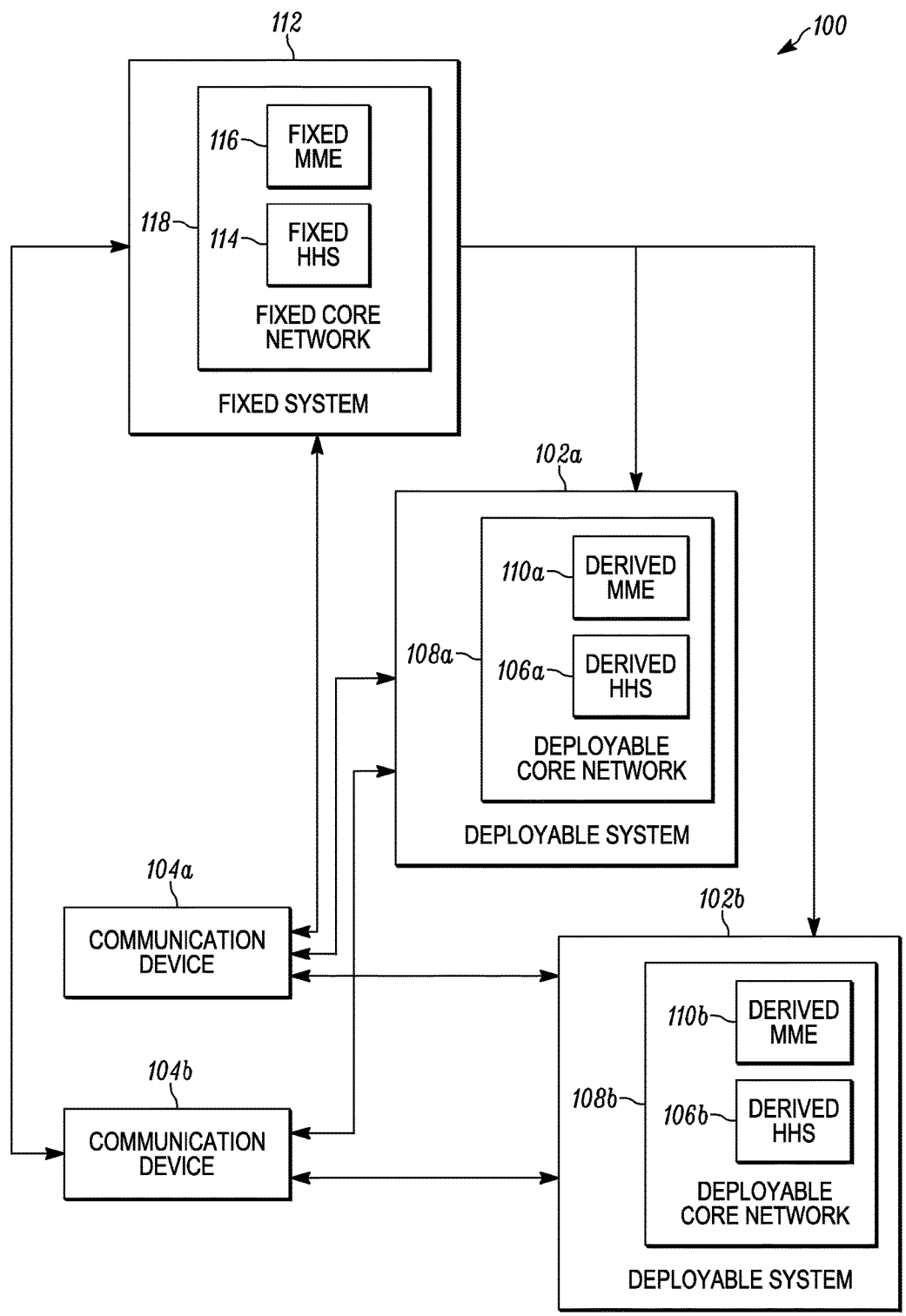
FIG. 1 is a block diagram of a system implemented in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and method for connecting a communication device to a deployable system without compromising authentication keys stored on a fixed LTE network. A method includes, on a deployable system, obtaining a deployable key derived on a fixed system for the deployable system based on an existing key stored on a database of the fixed system, wherein the existing key is used to authenticate a communication device. The method also includes the deployable system storing the deployable key; and subsequent to the storing, activating the deployable system to provide communication resources to communication devices disconnected from the fixed system. The activated deployable system is not connected to the fixed system. The method also includes receiving, by the deployable system, an authentication request from the communication device requesting connection to the deployable system; generating, by the deployable system, authentication vectors using the deployable key and generating an authentication request; transmitting the authentication request to the communication device and authenticating an authentication response received from the communication device using the authentication vectors.

FIG. 1 is a block diagram of a system implemented in accordance with some embodiments. System 100 includes at least one fixed LTE system 112, at least one deployable system 102 (i.e., deployable system 102a-102b) and at least one communication device 104 (i.e., communication device 104a-104b). Each deployable system 102 is standalone system that is not connected to fixed LTE infrastructure 112 during a period when the deployable system 102 is activated. The fixed LTE system 112 includes, among other components, a core network 118 including a database such as a home subscriber server (HSS) database 114 (referred to herein as a fixed HSS 114) and a mobility management entity (MME) 116 (referred to herein as a fixed MME 116). Fixed HSS 114 may store user-related and subscription-related information for connecting communication device 104 to the fixed LTE system 112. Other components of fixed LTE system 112 are not shown for ease of illustration.

Each deployable system 102 includes, among other components, a deployable core network 108 (i.e., deployable core networks 108a and 108b) for handling data traffic and a network of eNodeBs (not shown), each of which functions as a base station for deployable system 102 and forwards user data and signaling between deployable core network 108 and communication device 104 operating on deployable system 102. Each deployable system 102 also includes a deployable MME 110 (i.e., deployable MME 110a and 110b) that is in charge of functions related to end-user authentication and a deployable home subscriber server 106 (i.e., deployable HSS 106a-106b) for storing user-related and subscription-related information to enable the deployable system 102 to successfully complete network entry authentication of communication device 104. Communication device 104 may be, for example, computing devices such as phones and/or computers.

Consider that for each communication device 104, the fixed HSS 114 includes an authentication key (also referred to herein as an existing key or an existing authentication key) for authenticating the communication device to the fixed LTE system 112. For example, for communication device 104a, the fixed HSS 114 may include an operator key (OP) for identifying the operator of the fixed LTE system 112. Fixed HSS 114 may also include an International mobile Subscriber Identity (IMSI) for identifying a user of the network (in this case, communication device 104a), an authentication key/existing key (K) for authenticating communication device 104a, and in cases where mutual authentication is utilized by the network operator using, for example, the Milenage AKA algorithm, the fixed HSS 114 may also include an operator key (OPc) resulting from combining OP with K. In order to execute a symmetric authentication key agreement with the fixed HSS 114, communication device 104a also includes, among other information, the OPc, the IMSI and K values.

In an embodiment, each communication device 104 may be provisioned with a deployable system list including a list of identifiers. The list of identifiers may include, for example, the PLMN ID, for each deployable system 102. The PLMN ID for each deployable system 102 may be unique to that system. When connectivity to the LTE network is lost or otherwise unavailable, at least one deployable system 102 (for example, deployable system 102a) may be activated (booted-up or brought on line) subsequent to identifying an unavailable communication link between communication devices 104 and the LTE network. When a deployable system is brought activated, it is not connected to the fixed LTE system 112. Subsequent to deployable system 102a being activated, communication device 104a may obtain that the PLMN ID for deployable system 102a by scanning the LTE system information blocks transmitted on a LTE radio interface. In determining that the PLMN ID for deployable system 102a is included in the deployable system list provisioned on communication device 104a, communication device 104a may send an attachment request including its IMSI to deployable system 102a.

Rather than copying authentication keys, such as K and OPc, from the fixed HSS 114 to deployable HSS 106a and exposing those authentication keys to deployable HSS 106a, prior to booting up deployable system 102a, fixed HSS 114 may derive a unique new authentication key (Kd) (also referred to herein as an deployable authentication key), based on the authentication key/existing key (K) stored in the fixed HSS 114 for each communication device, and transfer the new authentication key (Kd) to the deployable HSS 106a. An authentication method implemented on deployable system 102a may utilize the new authentication key (Kd). Fixed system 112 may also derive an operator key (OPcd) (also referred to herein as a communication device specific operator key) for deployable system 102a. Subsequent to obtaining the derived authentication key (Kd) and the derived operator key (OPcd), deployable system 102a stores the derived authentication key (Kd) and the derived operator key (OPcd). After storing the obtained derived authentication key (Kd) and the derived operator key (OPcd), when connectivity to the LTE network is lost or otherwise unavailable, deployable system 102a may be activated to provide communication resources to communication devices 104 disconnected from the fixed system. Activated deployable system 102a is not connected to the fixed system.

Fixed HSS 114 may utilize a key derivation algorithm known to each communication device 104 to derive Kd and OPcd. The key derivation algorithm may be a cryptographic key derivation function that uses a cryptographic quality one-way HASH function that can combine sensitive data, such as K, with values that are stored in fixed HSS 114 and each communication device 104. For instance, as part of the key derivation process, fixed HSS 114 may derive the Kd by executing the key derivation algorithm on a concatenation of K, the PLMN ID for each deployable system 102, and a known key string that scopes the derived key for deployable use. The known key string that scopes the derived key for deployable use adds a fixed component to the key derivation process where the fixed component provides a name or a 'scope' for the purpose of the derived key.

Similarly, fixed HSS 114 may derive the OPcd by executing the key derivation algorithm on a concatenation of OPc, the PLMN ID for deployable system 102a, and/or a known string. In addition to the derived Kd and OPcd values, at least one non-derived subscription data, for example, the IMSI, may be copied from the fixed HSS 114 to deployable HSS 106a. Accordingly, in an embodiment, the authentication key (Kd) and operator key (OPcd) stored in a deployable HSS 106a are different from the authentication key (K) and operator key (OPc) stored in the fixed HSS 114. Despite the difference in the authentication keys stored in the deployable HSS 106a and the fixed HSS 114, deployable system 102a may use the derived authentication data stored in deployable HSS 106a to authenticate each communication device 104. At least one attribute in deployable HSS 106, for example, an authentication sequence number, may be synchronized with information in the fixed HSS. This ensures that modification of profile configuration in the fixed HSS is reflected in the deployable HSS.

Subsequent to activating deployable system 102a, deployable system 102a is configured to receive the authentication request from the communication device requesting connection to deployable system 102a. Subsequent to receiving the attachment request from communication device 104a, the authentication center associated with deployable system 102a computes authentication vectors using the derived OPcd and Kd computed for communication device 104a. The authentication center associated with deployable system 102a may also use a synchronized authentication sequence number in computing the authentication vectors. In some instances, synchronization of the authentication sequence number may be necessary depending on the specific authentication algorithm used by the fixed system and deployable system 102a. Accordingly, depending on the authentication algorithm, deployable system 102a may synchronize authentication sequence number(s) on deployable system 102a with authentication sequence number(s) on communication device 104a. Deployable system 102a sends an authentication request including the authentication vectors to communication device 104a.

Communication device 104a may utilize information stored in, for example, a universal integrated circuit card (UICC) (i.e., a smart card used in a mobile terminal) and the same key derivation algorithm used by deployable system 102a to create Kd and OPcd on communication device 104a. For example, communication device 104a may derive Kd by executing the key derivation algorithm on a concatenation of K, the unique PLMN ID for deployable system 102a, and the key scoping string and may derive OPcd by executing the key derivation algorithm on a concatenation of OPc, the unique PLMN ID for deployable system 102a, and/or a string to scope the key for deployable use.

Communication device 104a computes an authentication response to the authentication request it received from deployable system 102a using the Kd and OPcd derived on communication device 104a. Communication device 104a transmits the authentication response to deployable system 102a, wherein deployable system 102a uses the authentication vectors to authenticate the authentication response received from the communication device. Accordingly, communication device 104a may mutually authenticate to each deployable system 102 to which communication device 104a attaches. In this embodiment, because the PLMN ID for deployable system 102a is unique, the derived authentication keys on communication device 104a (i.e., Kd and OPcd derived on communication device 104a) will be associated with only deployable system 102a.

The operator of the fixed LTE network 112 may limit the distribution of the deployable system list stored in communication devices. This allows for the network operator to permit and revoke access to a deployable network. In an embodiment, the network operator may prevent a communication device from attaching to a compromised deployable system by removing the PLMN ID for the compromised deployable system from the deployable system list in the communication device. When the PLMN ID for a deployable system is removed from the deployable system list, after the deployable system is booted up, as the communication device scans the system information block transmitted on the LTE radio interface, it may obtain the PLMN ID for the compromised deployable system. However, the communication device will not attach to the deployable network because the PLMN ID for that compromised deployable system would not be in the deployable system list.

In an embodiment, rather than supplying unique PLMN IDs (also referred to herein as a unique identifier) for each deployable system 102, the system operator may supply one global PLMN ID (also referred to herein as a global identifier) for all or a group of deployable systems. In this embodiment, when the communication device detects a deployable system with the global PLMN ID, the communication device uses the key derivation function to derive keys necessary to mutually authenticate to all deployable systems associated with the global PLMN ID. In this embodiment, if one deployable system associated with the global PLMN ID is compromised, the system operation will be unable to prevent authentication between the communication device and the compromised deployable system. In such case, a new global PLMN ID would need to be provisioned in the non-compromised deployable systems 102 and in the communication devices 104.

In another embodiment, each deployable system 102 may broadcast a deployable ID (DID) that may be used in key derivation. The DID may be used in place of the PLMN ID, or in addition to the PLMN ID, for example, in cases where the operation provides a global PLMN ID. The operator may prevent authentication between the communication device and, for example, a compromised deployable system, by presenting a list of revoked DIDs (referred to herein as a revoked list), wherein the communication device is prevented from deriving authentication keys for a deployable system if it's DID is in the revoked list. Similarly, the operator may enable mutual authentication between communication device and a deployable system by presenting a list of allowed DIDs, wherein the communication device may derive authentication keys for a deployable system if it's DID is in the list of allowed DIDs.

Figure 2:
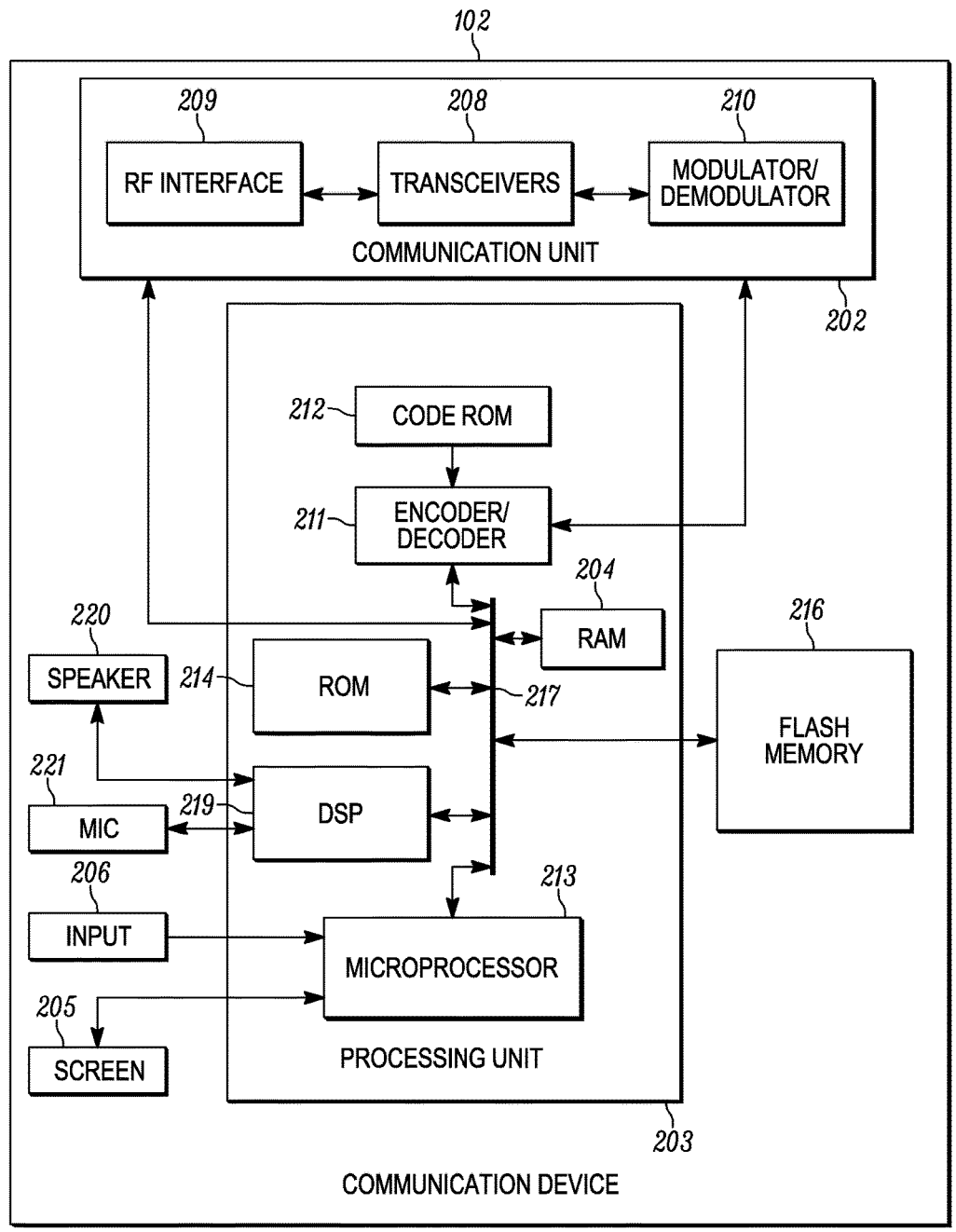
FIG. 2 is a block diagram of a communication device used in accordance with some embodiments.

FIG. 2 is a block diagram of a communication device, such as communication devices 104a-104b, used in accordance with some embodiments. Communication device 200, for example, may include a communications unit 202 coupled to a common data and address bus 217 of a processor 203. Communication device 200 may also include an input unit (e.g., keypad, pointing device, etc.) 206, an output transducer unit (e.g., speaker) 220, an input transducer unit (e.g., a microphone) (MIC) 221, and a display screen 205, each coupled to be in communication with the processor 203.

The processor 203 may include, that is, implement, an encoder/decoder 211 with an associated code read-only memory (ROM) 212 for storing data for encoding and decoding voice, data, control, or other signals that may be transmitted or received by communication device 200. The processor 203 may further include one or more of a microprocessor 213 and digital signal processor (DSP) 219 coupled, by the common data and address bus 217, to the encoder/decoder 211 and to one or more memory devices, such as a ROM 214, a random access memory (RAM) 204, and a static memory 216. One or more of ROM 214, RAM 204 and flash memory 216 may be included as part of processor 203 or may be separate from, and coupled to, the processor 203. The encoder/decoder 211 and may be implemented by microprocessor 213 or DSP 219, or may be implemented by a separate component of the processor 203 and coupled to other components of the processor 203 via bus 217.

Communications unit 202 may include an RF interface 209 configurable to communicate with network components, and other communication device within its communication range. Communications unit 202 may include one or more broadband and/or narrowband transceivers 208, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 202 may also include one or more deployable area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 210 that is coupled to the encoder/decoder 211.

Figure 3:
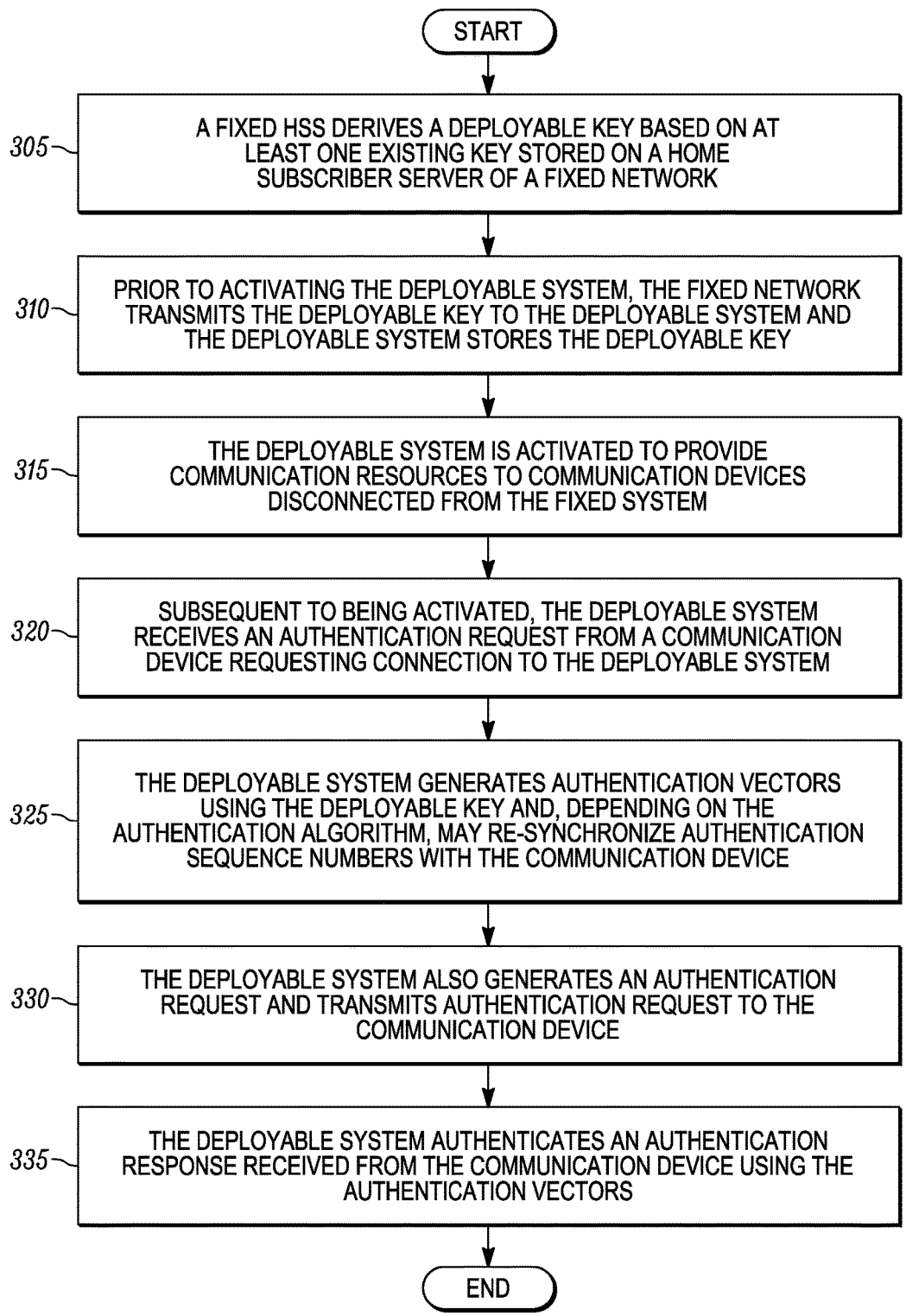
FIG. 3 is a flowchart of a method of authenticating a communication device on a deployable network without compromising authentication keys stored on a LTE network in accordance with some embodiments.
Figure 4:
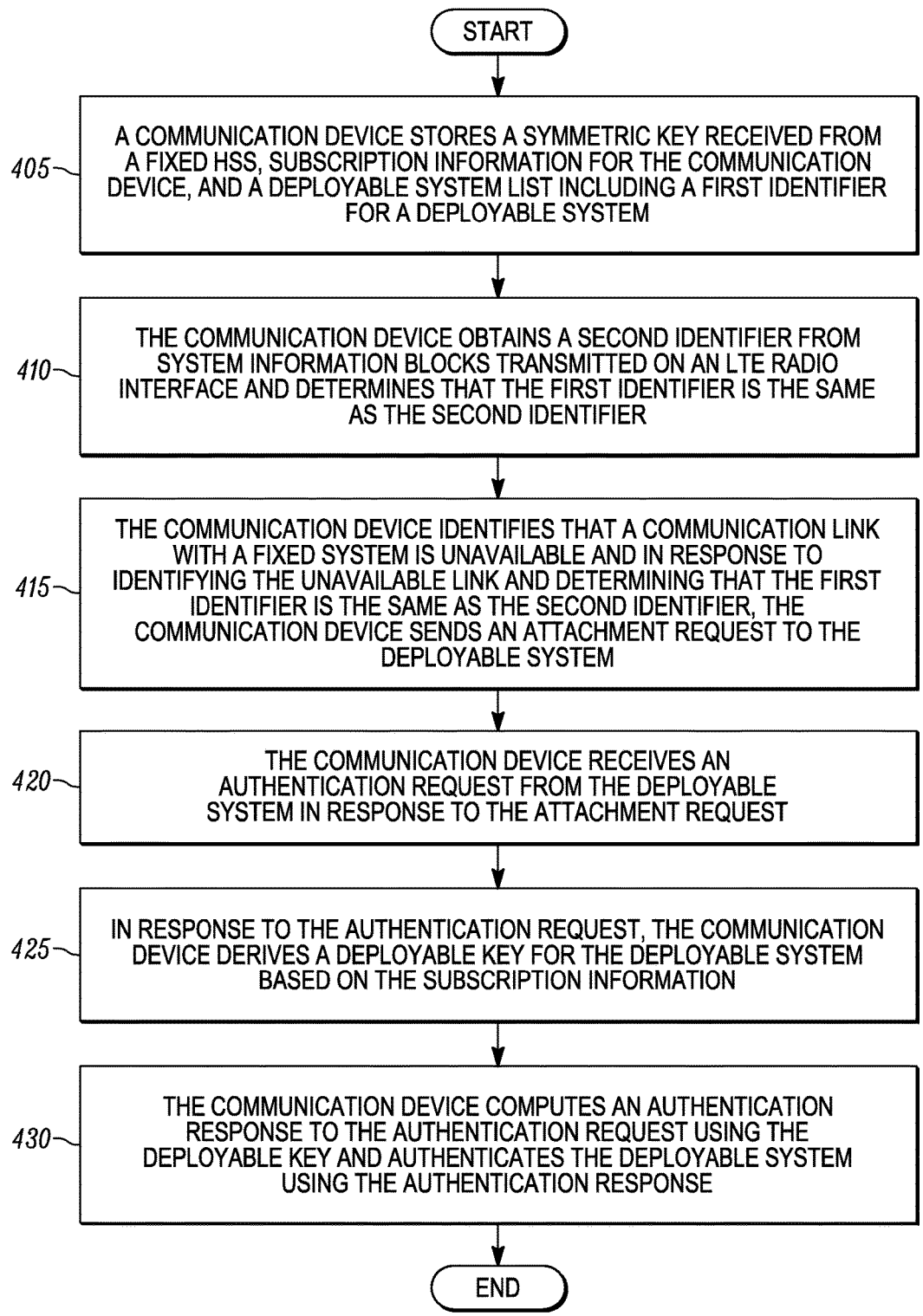
FIG. 4 is a flowchart of a method of authenticating a deployable network on a communication device without compromising authentication keys stored on a LTE network in accordance with some embodiments.

The one or more memory devices 204, 212, 214, 216 store code for decoding or encoding data such as control, request, or instruction messages, channel change messages, and/or data or voice messages that may be transmitted or received by device 200 and other programs and instructions that, when executed by the processor 203, provide for the device 200 (for example, communication devices 104a-104d) to perform a set of functions and operations described herein as being performed by such a device, such as the implementation of the encoder/decoder 211 and one or more of the steps set forth in FIG. 3 and FIG. 4.

FIG. 3 is a flowchart of a method of authenticating a communication device on a deployable network without compromising authentication keys stored on a fixed LTE network in accordance with some embodiments. At 305, a fixed HSS derives a deployable key based on at least one existing key stored on a home subscriber server of a fixed network. At 310, prior to activating the deployable system, the fixed network transmits the deployable key to the deployable system and the deployable system stores the deployable key. At 315, deployable system is activated to provide communication resources to communication devices disconnected from the fixed system. The activated deployable system is not connected to the fixed system. At 320, subsequent to being activated, the deployable system receives an authentication request from a communication device requesting connection to the deployable system. At 325, the deployable system generates authentication vectors using the deployable key and, depending on the authentication algorithm, may re-synchronize authentication sequence numbers with the communication device. At 330, the deployable system also generates an authentication request and transmits authentication request to the communication device. At 335, the deployable system authenticates an authentication response received from the communication device using the authentication vectors.

FIG. 4 is a flowchart of a method of authenticating a deployable network on a communication device without compromising authentication keys stored on a fixed LTE network in accordance with some embodiments. At 405, the communication device stores a symmetric key received from a fixed HSS, subscription information for the communication device, and a deployable system list including a first identifier for a deployable system. At 410, the communication device obtains a second identifier from system information blocks transmitted on an LTE radio interface and determines that the first identifier is the same as the second identifier. At 415, the communication device identifies that a communication link with a fixed system is unavailable and in response to identifying the unavailable link and determining that the first identifier is the same as the second identifier, the communication device sends an attachment request to the deployable system. At 420, the communication device receives an authentication request from the deployable system in response to the attachment request. At 425, the communication device derives a deployable key for the deployable system based on the subscription information. At 430, the communication device computes an authentication response to the authentication request using the deployable key and authenticates the deployable system using the authentication response.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    obtaining, by a deployable system, a deployable key derived on a fixed system for the deployable system based on an existing key stored on a database of the fixed system, wherein the existing key is used to authenticate a communication device;
    storing, by the deployable system, the deployable key;
    subsequent to the storing, activating the deployable system to provide communication resources to communication devices disconnected from the fixed system, wherein an activated deployable system is not connected to the fixed system;
    subsequent to activating the deployable system, receiving, by the deployable system, an authentication request from the communication device requesting connection to the deployable system;
    generating, by the deployable system, authentication vectors using the deployable key and generating an authentication request; and
    transmitting, by the deployable system, the authentication request to the communication device and authenticating an authentication response received from the communication device using the authentication vectors.

2. The method of claim 1, wherein the obtaining comprises:
    obtaining a deployable authentication key derived for the deployable system, wherein the deployable authentication key is derived by executing a key derivation algorithm on a concatenation including an authentication key for the communication device and an identifier of the deployable system; and
    obtaining a communication device specific operator key derived by executing the key derivation algorithm on a concatenation of an operator key of the fixed system and the identifier of the deployable system.

3. The method of claim 1, wherein the generating comprises generating the authentication vectors using the deployable key and a synchronized authentication sequence number, wherein an authentication sequence number is synchronized in accordance with an authentication algorithm used by the fixed system and the deployable system.

4. The method of claim 1, further comprising copying at least one non-derived subscription data from a home subscriber server of the fixed system to the deployable system.

5. The method of claim 1, further comprising synchronizing at least one attribute in the deployable system with information in the database of the fixed system.

6. The method of claim 1, further comprising broadcasting, by the deployable system, an identifier of the deployable system, wherein the broadcasting comprises broadcasting one of a unique identifier for the deployable system and a global identifier associated with a group of deployable systems.

7. An apparatus, comprising:
    a deployable system including:
    a hardware processor;
    a transceiver for receiving a deployable key derived on a fixed system for the deployable system based on an existing key stored on a database of the fixed system, wherein the existing key is used to authenticate a communication device,
        wherein subsequent to the receiving, the deployable system is activated to provide communication resources to communication devices disconnected from the fixed system, wherein an activated deployable system is not connected to the fixed system,
        the transceiver being further configured to receive, subsequent to the deployable system being activated, an authentication request from the communication device requesting connection to the deployable system;
    a deployable home subscriber server configured to generate authentication vectors using the deployable key and generate an authentication request, wherein the transceiver is further configured to transmit the authentication request to the communication device; and
    a mobility management entity configured to authenticate an authentication response received from the communication device using the authentication vectors.

8. The apparatus of claim 7, wherein the deployable key includes:
    a deployable authentication key derived for the deployable system, wherein the deployable authentication key is derived by executing a key derivation algorithm on a concatenation including an authentication key for the communication device and an identifier of the deployable system; and a communication device specific operator key derived by executing the key derivation algorithm on a concatenation of an operator key of the fixed system, and the identifier of the deployable system.

9. The apparatus of claim 7, wherein the generating comprises generating the authentication vectors using the deployable key and a synchronized authentication sequence number, wherein an authentication sequence number is synchronized in accordance with an authentication algorithm used by the fixed system and the deployable system.

10. The apparatus of claim 7, wherein at least one non-derived subscription data from the home subscriber server is copied to the deployable system.

11. The apparatus of claim 7, at least one attribute in the deployable system is synchronized with information in the database of the fixed system.

12. The apparatus of claim 7, wherein the deployable system is further configured to broadcast an identifier of the deployable system, wherein the broadcasting comprises broadcasting one of a unique identifier for the deployable system and a global identifier associated with a group of deployable systems.

* * * * *